Sept. 12, 1939.  M. J. MITCHELL  2,172,982
CONVEYER FOR HARVESTER-THRESHERS
Filed June 3, 1938   2 Sheets-Sheet 1

Inventor
Melville J. Mitchell
By V. F. Lasagne
Atty.

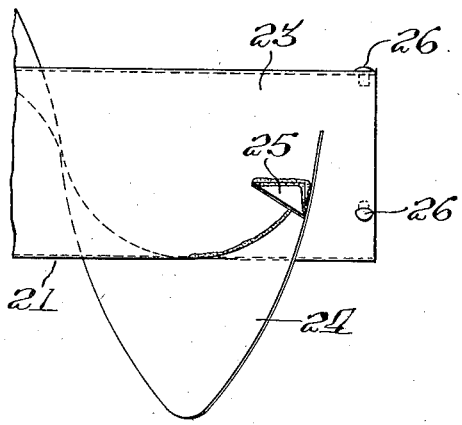
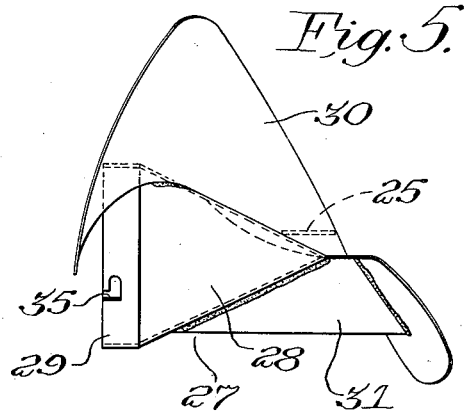
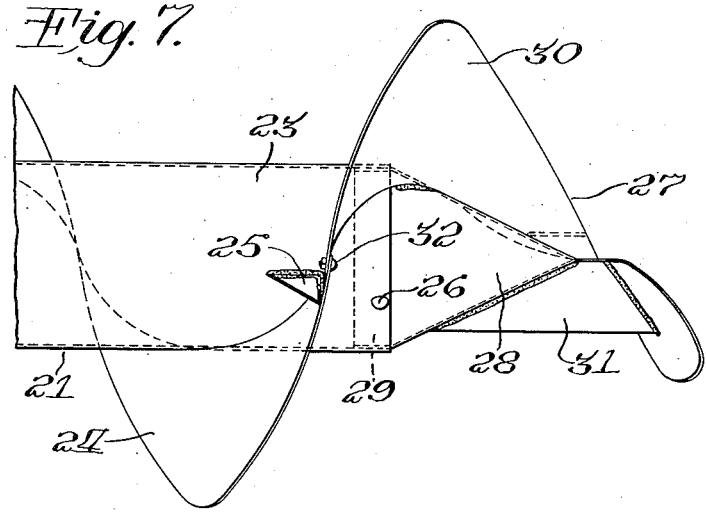
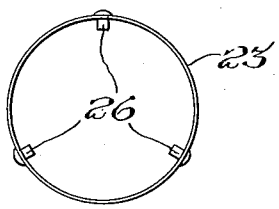
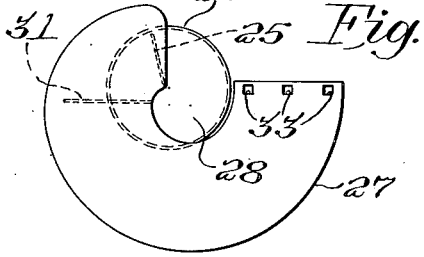

Patented Sept. 12, 1939

2,172,982

UNITED STATES PATENT OFFICE 2,172,982

CONVEYER FOR HARVESTER-THRESHERS

Melville J. Mitchell, Moline, Ill., assignor to International Harvester Company, a corporation of New Jersey Application June 3, 1938, Serial No. 211,612

11 Claims. (Cl. 198—87)

This invention relates to harvester thresher construction. More particularly, it relates to a spiral conveyer for a harvester thresher, which is made detachable in part in order that parts of the harvester may be shifted to a transport position.

In harvester threshers of known types, there is a platform of extended length behind a cutter bar, which platform receives the crop as it is cut. A spiral conveyer is normally mounted on the platform. For transporting, it is desirable to reduce the width of the harvester, and this may be done by swinging the platform from its horizontal position to a vertical position. In such a case, the spiral conveyer must also be swung with the platform. This has presented a problem since the conveyer will normally extend across the axis about which the harvester platform is swung.

An object of the invention is to provide a harvester thresher of improved construction.

A further object is the provision of a harvester in which a crop-receiving platform is made in sections adapted to be swung about one another.

Another object is to provide a harvester thresher, the effective width of which may be easily reduced for transport.

Still another object is the provision of a spiral conveyer with a detachable end capable of use with a folding crop-receiving platform.

According to the invention, a crop-receiving platform is provided behind a cutter bar, which platform is in sections with an endless conveyer at one end. The section away from the endless conveyer is capable of being swung with respect to the section next to the endless conveyer, after the knife or cutter has been removed from the cutter bar. A spiral conveyer is mounted over the platform and extends the length thereof with a detachable end part secured over the part immediately adjacent the endless conveyer. The spiral conveyer is so arranged as to swing with the swingable section of the platform. The detachable end part is removed so as not to strike the stationary platform section as the spiral conveyer and movable platform section are swung.

In the drawings:

Figure 3 is a view showing the end of the spiral conveyer for use with the crop-receiving platform;

Figure 4 shows an end view of the pipe;

Figure 5 shows a side view of the detachable end part for the spiral conveyer;

Figure 6 shows an end view of the same part; and,

Figure 7 shows the spiral conveyer with the end part secured thereto.

Figure 1:
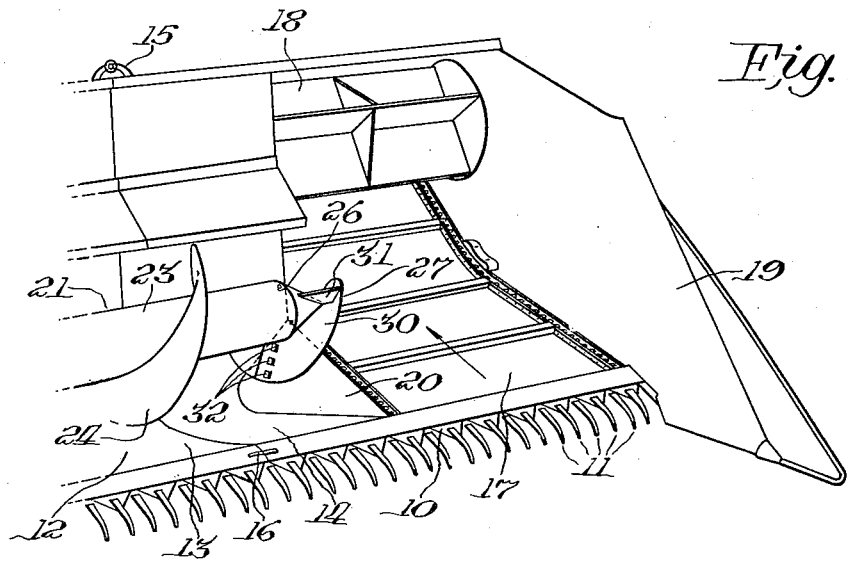
Figure 1 is a perspective view, showing the parts of a thresher adjacent the cutter bar.

In Figure 1 there is shown as part of a harvester thresher a cutter bar 10 with guards 11. A harvester or crop-receiving platform 12, immediately adjacent the cutter bar, is composed of trough sections 13 and 14 hinged to one another, as at 15 and 16. At one end of the section 14, there is an endless conveyer 17 moving in a direction indicated by the arrow thereon at right angles to the line of the trough sections 13 and 14. At the farther end of the endless conveyer is a beater 18. A divider 19 is at the side of the endless conveyer. An inclined ramp 20 rests in the trough section 14 immediately adjacent the endless conveyer.

A spiral conveyer or auger feed 21 extends the length of the platform 12 and is effective to feed the crop cut by the cutter bar 10 and deposited on the platform 12 along the platform to the endless conveyer 17.

The spiral conveyer, as shown in Figure 3, includes a pipe or hollow shaft 23 and a helical fin 24 welded to the exterior thereof. The fin stops short of the end and is stiffened by a brace 25 welded to both fin and pipe. There are three pins 26 extending inwardly at the end of the pipe.

As part of the spiral conveyer, there is also a detachable end part 27 formed of a hollow cone 28 with a cylindrical extension 29 and a helical fin 30 welded to the cone. This fin extends beyond the point of the cone 28 and is supported by a brace 31, welded to both fin and cone. The fin extends over and beyond the cylindrical extension 29 out of contact therewith, so that, when the detachable end part is secured to the shaft 23, the fin 30 overlaps the fin 24 on the side of the fin 24 away from the end of the shaft. The fins are secured to one another by bolt and nut connections 32 through holes 33 in the fin 30 and similar holes 34 in the fin 24. The cylindrical extension 29 fits within the end of the shaft 23 with bayonet slots 35 engaging the pins 26.

From the description, it will be seen that the end part 27 is capable of easy attachment and detachment from the shaft 23. Yet the end part and shaft, when secured to one another, form a unitary and rigid spiral conveyer element.

Figure 2:
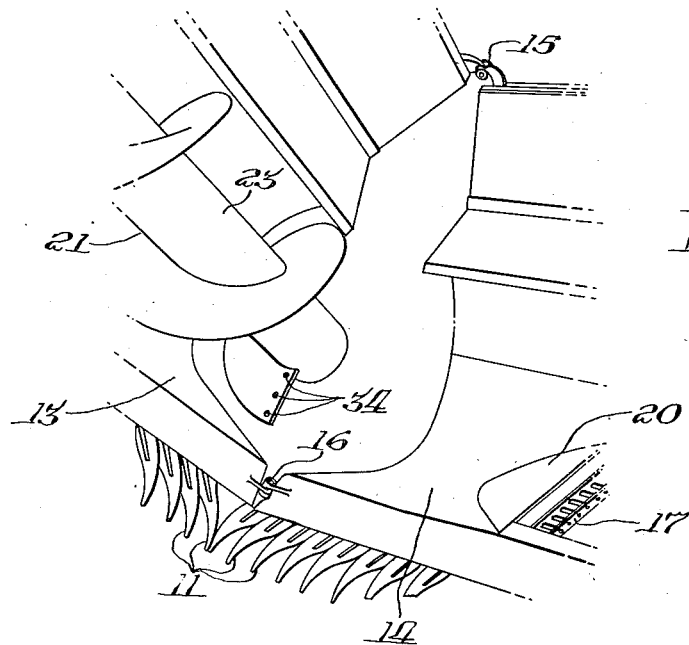
Figure 2 is a similar perspective view, showing the crop-receiving platform in folded position.

The reason for a detachable end part for the conveyer may be seen from Figure 2, where the trough section 13 of the platform 12 and the spiral conveyer 21 are shown swung up into a vertical position about the trough section. The end part 27 of the conveyer has been removed and consequently the spiral conveyer is able to swing without striking the trough section 14.

From the foregoing description, it will be apparent that a novel construction in harvesters has been provided, which will allow the swinging of one section of the crop-receiving platform from a horizontal position to a vertical position for transport. The particular construction of the spiral conveyer makes this possible.

The intention is to limit the invention only in the terms of the appended claims.

What is claimed is:

1. In a harvester thresher, a first platform section, an endless conveyer adjacent thereto, a second platform section forming an extension of the first platform section and swingable thereabout, a spiral feed element extending over both platform sections and swingable with the second platform section and having a detachable conical end portion secured to the end of the feed element over the first platform section.

2. In a harvester thresher, means for receiving crops as they are cut, said means being hinged along a line near one end, a spiral feed element extending along the means and having an end adjacent the end which the hinge line is near, and a detachable conical end secured to said end of the spiral feed element.

3. In a harvester thresher, means for receiving crops as they are cut, said means being composed of hinged sections arranged so that one may swing about the other, a feed element extending along both sections of the means and arranged to swing with one section, and a detachable end part secured to the end of the feed element extending along the section with respect to which the feed element swings.

4. In a harvester thresher, a platform formed of trough sections hinged to one another in alinement and arranged so that one may swing about the other, a conveyer adjacent one of the sections and extending generally at right angles to the direction of the trough, a spiral feeding element positioned in the trough sections and arranged to swing about the section adjacent the conveyer, and a detachable conical end part secured to the end of the feeding element in the trough section adjacent the conveyer and extending into immediate adjacency to the conveyer.

5. In a harvester thresher, means for receiving crops as they are cut, said means being formed of a pair of sections arranged so that one may pivot about the other, a conveying means positioned at one end of the receiving means and adjacent one section thereof, and a feeding means extending along the receiving means and arranged to pivot about the section thereof adjacent the conveying means, and a detachable end part secured to the feeding means in immediate adjacency to the conveying means.

6. In combination, a pair of trough sections positioned in alinement and arranged so that one may pivot about the other, a spiral feed element extending within the trough sections and adapted to swing with one of the sections about the other, and a detachable end part secured to the feed element at the end within the trough section about which the feel element swings.

7. A feed device comprising a shaft, a spiral fin secured to the shaft and extending the length thereof, and a detachable end part secured to one end of the shaft and comprising a cone having a base diameter substantially the same as that of the shaft and a spiral fin overlapping the fin on the shaft on the side thereof away from the end of the shaft.

8. A feed element comprising a hollow shaft, a spiral fin secured to the exterior of the shaft, and a detachable end part secured to one end of the shaft and comprising a cone with a cylindrical end thereon fitting within the end of the shaft and a spiral fin overlapping the fin on the shaft on the side away from the end of the shaft.

9. A feed element comprising a hollow shaft, a spiral fin welded to the exterior of the shaft and extending to a point near the end thereof, a bracing element welded to the end of the fin and the shaft at said end on the side of the fin away from the end of the shaft, pins extending inwardly at said end of the shaft, and a detachable end part comprising a cone with a cylindrical extension at the base fitting within said end of the shaft and receiving the pins in bayonet slots, a spiral fin welded to the exterior of the cone and extending over the end of the shaft in overlapping relation and secured with the fin thereon and beyond the tip of the cone, and a brace welded to the surface of the cone and the portion of the fin on the cone extending beyond the cone.

10. In a thresher, a harvester platform formed of two trough sections pivoted to one another and positioned in alinement, an endless conveyer at the end of one section extending at right angles to the line of the trough, and a spiral feed element extending along the trough sections and arranged to pivot with the one trough section about the other trough section, said feed element being composed of a hollow shaft and a spiral fin welded to the exterior thereof, an end part secured to the end of the feed element adjacent the endless conveyer, said part comprising a cone having a cylindrical extension fitting within and secured to the end of the shaft, and a spiral fin welded to the cone and extending beyond the tip thereof and also extending over the end of the shaft in secured engagement with the fin on the shaft.

11. A feed element comprising a shaft, a spiral fin secured to the exterior of the shaft, a detachable conical member secured to one end of the shaft, and a spiral fin secured to the conical member as a continuation of the spiral fin on the shaft and extending considerably beyond the point of the conical member.

MELVILLE J. MITCHELL.